United States Patent
Hongo et al.

(10) Patent No.: US 8,724,299 B2
(45) Date of Patent: May 13, 2014

(54) EXTERNAL COMPONENT AND PORTABLE ELECTRONIC DEVICE

(75) Inventors: Manabu Hongo, Kawasaki (JP);
Tatsuhito Araki, Kawasaki (JP);
Hiroaki Sakashita, Kawasaki (JP);
Hiroaki Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/230,396

(22) Filed: Sep. 12, 2011

(65) Prior Publication Data

US 2012/0063075 A1    Mar. 15, 2012

(30) Foreign Application Priority Data

Sep. 15, 2010 (JP) ................... 2010-207004

(51) Int. Cl.
*G06F 1/16* (2006.01)

(52) U.S. Cl.
USPC .... 361/679.01; 455/557; 248/694; 312/270.2

(58) Field of Classification Search
USPC ................... 455/566, 434, 404.1, 414.1, 557;
361/679.33, 679.34, 679.55, 679.27,
361/679.31, 679.26, 679.01, 679.52,
361/679.08, 679.48, 679.58, 679.39;
248/213.2, 220.21, 124.1, 309.1,
248/220.22, 694, 71, 639, 282.1;
312/319.2, 223.1, 223.2, 244, 270.2
See application file for complete search history.

(56) References Cited

U.S. PATENT DOCUMENTS

2008/0165485 A1* 7/2008 Zadesky et al. ............... 361/683
2011/0228493 A1* 9/2011 Liang et al. ................... 361/752

FOREIGN PATENT DOCUMENTS

| JP | 2000-236377 A | 8/2000 |
| JP | 2004-342333 | 12/2004 |
| JP | 2007-312213 | 11/2007 |

OTHER PUBLICATIONS

Japanese Office Action mailed Jan. 7, 2014 for corresponding Japanese Application No. 2010-207004, with English-language translation.
(JPOA) Office Action of Japanese Patent Application No. 2010-207004 dated Mar. 25, 2014 with Partial Translation.

* cited by examiner

*Primary Examiner* — Hung Duong
(74) *Attorney, Agent, or Firm* — Fujitsu Patent Center

(57) ABSTRACT

An external component attachable to a portable electronic device includes a curved surface attachable to a convex surface of the portable electronic device and attaching portions formed at both ends of the curved surface and fixable to the portable electronic device. The curved surface curves such that the width between the attaching portions is narrower than the width between fixing portions of the portable electronic device to which the attaching portions are fixable.

7 Claims, 5 Drawing Sheets

EXTERNAL COMPONENT AND PORTABLE ELECTRONIC DEVICE

CROSS-REFERENCE TO RELATED APPLICATIONS

This application is based upon and claims the benefit of priority of the prior Japanese Patent Application No. 2010-207004, filed on Sep. 15, 2010, the entire contents of which are incorporated herein by reference.

FIELD

The embodiment discussed herein is related to an external component and a portable electronic device.

BACKGROUND

Sometimes portable electronic devices, such as cellular phones, of the same model are available in different designs (e.g., different colors). Users can select a design that they like out of many designs. Japanese Laid-open Patent Publication No. 2000-236377 discloses a portable electronic device to the exterior of which an external component such as a panel can be attached.

SUMMARY

According to an aspect of an embodiment, an external component attachable to a portable electronic device includes a curved surface attachable to a convex surface of the portable electronic device and attaching portions formed at both ends of the curved surface and fixable to the portable electronic device. The curved surface curves such that the width between the attaching portions is narrower than the width between fixing portions of the portable electronic device to which the attaching portions are fixable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiment of the external component and the portable electronic device disclosed by this application will be described in detail with reference to the drawings. The external component and portable electronic device disclosed by this application are not limited by this embodiment.

Figure 1:
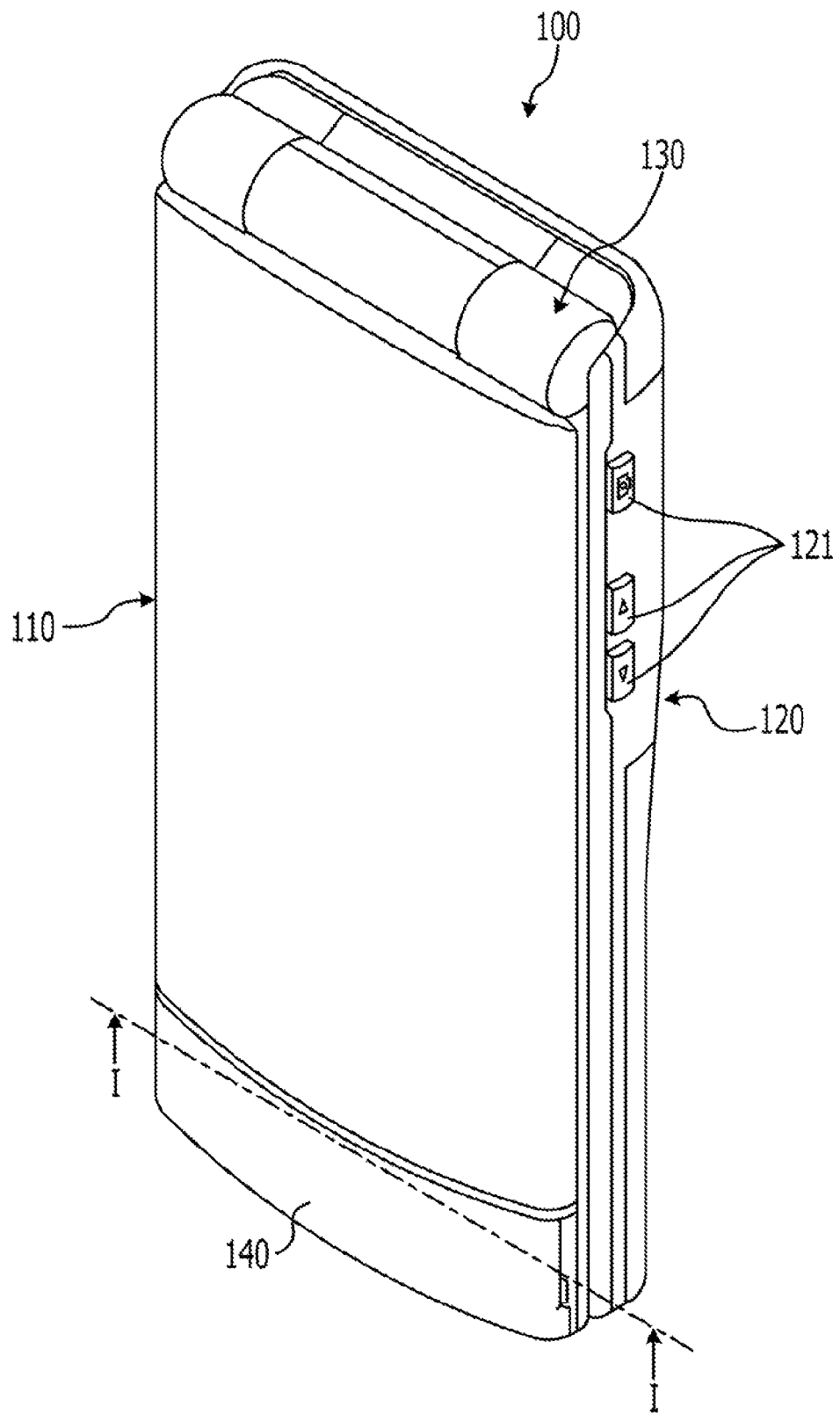
FIG. 1 is a perspective view of a portable electronic device according to the embodiment.

FIG. 1 is a perspective view of a portable electronic device according to this embodiment. As illustrated in FIG. 1, the portable electronic device 100 according to this embodiment is a flip-type cellular phone and has a movable side case 110 and a stationary side case 120. The movable side case 110 and the stationary side case 120 are connected by a connecting portion 130 such that the movable side case 110 can be opened and closed relative to the stationary side case 120. FIG. 1 illustrates an example of a state where the movable side case 110 is closed relative to the stationary side case 120.

The movable side case 110 is provided with a display portion and so forth (not illustrated). An external component 140 can be attached to the exterior of the movable side case 110. When using the portable electronic device 100 illustrated in FIG. 1, the user can attach and remove the external component 140 to and from the movable side case 110. FIG. 1 illustrates an example of a state where the external component 140 is attached to the movable side case 110.

The stationary side case 120 is provided with operating portions such as a multifunction key, an enter key, a dial key, and numerical keys (not illustrated), various side keys 121, and so forth. The movable side case 110 and the stationary side case 120 are formed of a lightweight and high-strength material such as magnesium alloy into a box shape.

Figure 2:
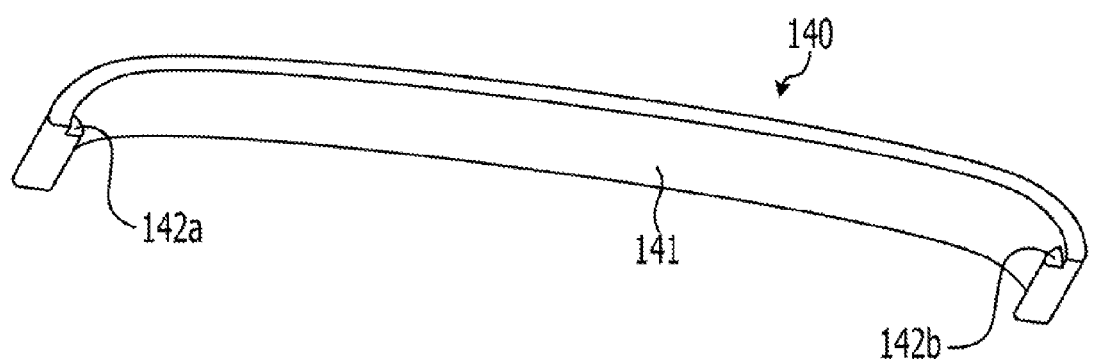
FIG. 2 is a perspective view of an external component.

Next, with reference to FIG. 2, the external component 140 will be described. FIG. 2 is a perspective view of the external component 140. The external component 140 is, for example, an opaque member, or a colorless or colored transparent or semi-transparent member. The user can select an external component 140 that they like out of various designs of external components 140. As a result, the commercial value of the portable electronic device 100 can be enhanced, and therefore the user can be enticed to purchase it.

As illustrated in FIG. 2, the external component 140 is U-shaped and has a curved surface 141 and attaching portions 142a and 142b. The curved surface 141 is a surface that faces the movable side case 110 when the external component 140 is attached to the movable side case 110. The curved surface 141 curves on both sides of the external component 140, thereby forming the external component 140 into a U-shape.

The attaching portions 142a and 142b are formed at both ends of the external component 140. The attaching portions 142a and 142b are latched onto the sides of the movable side case 110 when the external component 140 is attached to the movable side case 110. That is, by latching the attaching portions 142a and 142b onto the movable side case 110, the external component 140 is attached to the movable side case 110. The shape of the attaching portions 142a and 142b will be described later with reference to FIG. 5.

Figure 3:
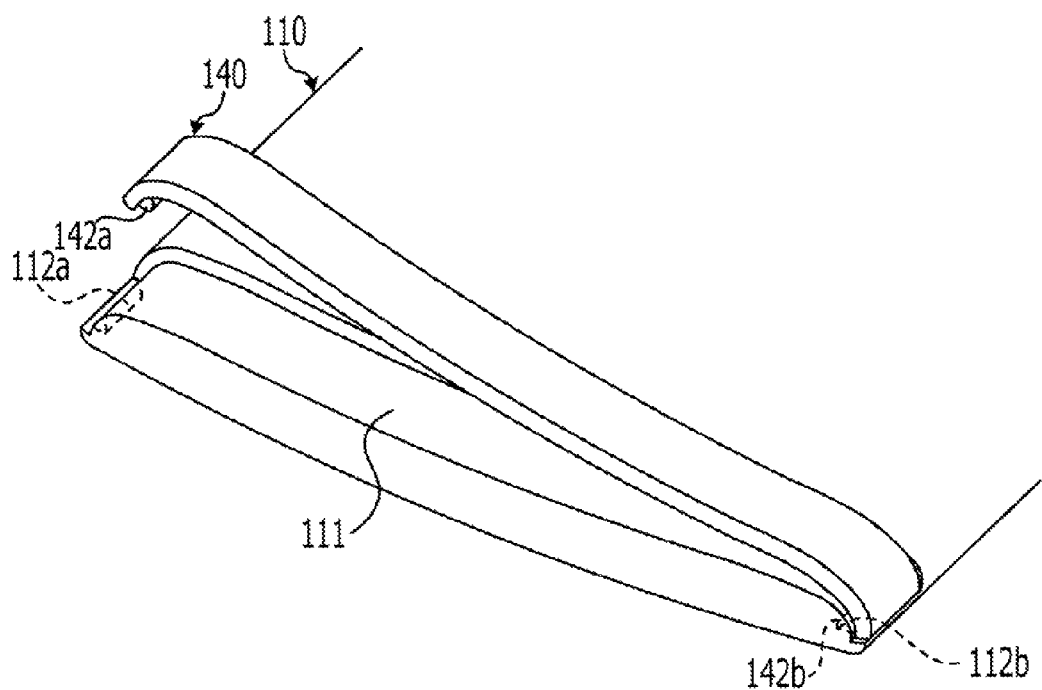
FIG. 3 is a perspective view of a state where the external component is being attached to a movable side case.

Next, with reference to FIG. 3, a state where the external component 140 is being attached to the movable side case 110 will be described. FIG. 3 is a perspective view of a state where the external component 140 is being attached to the movable side case 110.

As illustrated in FIG. 3, the movable side case 110 has a convex surface 111. The convex surface 111 is formed in a recessed portion of the movable side case 110. The depth of the recess is substantially equal to the thickness of the external component. Accordingly, as illustrated in FIG. 1, when the external component 140 is attached to the movable side case 110, the top surface (i.e., the surface opposite the curved surface 141 or the external surface) of the external component 140 is substantially flush with the top surface (i.e., the external surface) of the movable side case 110. The convex surface 111 is a smooth convex surface and faces the curved surface 141 when the external component 140 is attached to the movable side case 110. In the example illustrated in FIG. 3, the convex surface 111 has such a shape that substantially the same shape as the shape of the external component 140 is removed from the outer side of the movable side case 110.

In the convex surface 111, fixing portions 112a and 112b are formed. The attaching portion 142a of the external component 140 is engaged with the fixing portion 112a. The attaching portion 142b of the external component 140 is engaged with the fixing portion 112b. The fixing portions 112a and 112b are U-shaped grooves. That is, as illustrated in FIG. 3, by engaging the attaching portion 142a of the external component 140 with the fixing portion 112a and engaging the attaching portion 142b of the external component 140 with the fixing portion 112b, the external component 140 is attached to the movable side case 110. The shape of the fixing portions 112a and 112b will be described later.

Figure 4:
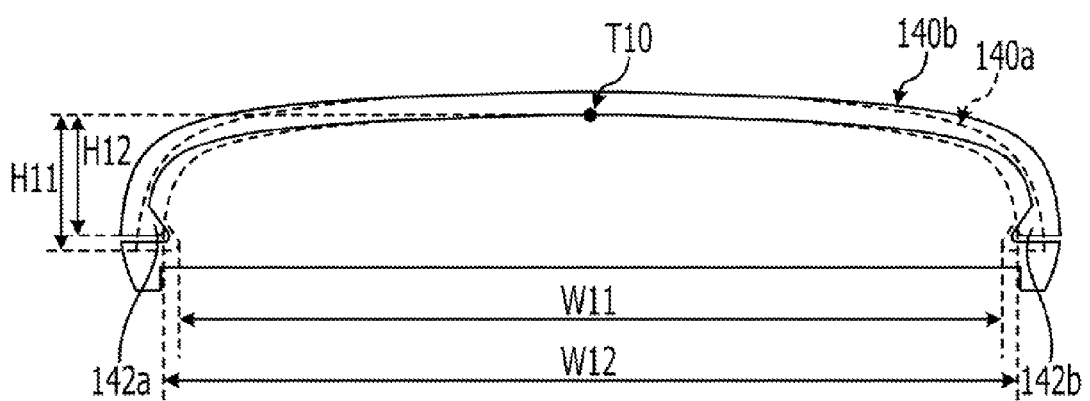
FIG. 4 is a schematic sectional view taken along line I-I of FIG. 1.

Next, with reference to FIG. 4, the external component 140 will be described. FIG. 4 is a schematic sectional view taken along line I-I of FIG. 1. In the example illustrated in FIG. 4, the external component 140a indicated by a dashed line indicates the shape of the external component 140 in the case where the external component 140 is not attached to the movable side case 110. The external component 140b indicated by a solid line indicates the shape of the external component 140 in the case where the external component 140 is attached to the movable side case 110.

As indicated by a dashed line (140a) in FIG. 4, in the case where the external component 140 is not attached to the movable side case 110, the width W11 between the attaching portions 142a and 142b is narrower than the width W12 between the fixing portions 112a and 112b of the movable side case 110. In other words, the curved surface 141 of the external component 140 curves such that the width W11 between the attaching portions 142a and 142b is narrower than the width W12 between the fixing portions 112a and 112b.

Thus, when the external component 140 is attached to the movable side case 110, the curved surface 141 of the external component 140 deforms along the shape of the convex surface 111. In other words, the external component 140 expands in the direction of width W11 between the attaching portions 142a and 142b, and is attached to the movable side case 110 along the outer shape of the convex surface 111. That is, as indicated by a solid line (140b) in FIG. 4, the external component 140 is attached to the movable side case 110 such that a gap is not formed between the external component 140 and the convex surface 111 of the movable side case 110. For this reason, even when the shape of the movable side case 110 and the shape of the external component 140 do not coincide with each other, for example, due to the manufacturing error, the external component 140 attached to the movable side case 110 does not rattle. As a result, even when the external component 140 is attached to the portable electronic device 100 according to this embodiment, the portable electronic device 100 can be prevented from looking cheap, and the commercial value thereof can be prevented from decreasing.

In addition, because the width W11 between the attaching portions 142a and 142b is narrower than the width W12 between the fixing portions 112a and 112b, a stress acts on the movable side case 110 from both ends of the external component 140 when the external component 140 is attached to the movable side case 110. Thus, in the portable electronic device 100 according to this embodiment, the external component 140 is not prone to come off of the movable side case 110.

As illustrated in FIG. 4, when the external component 140 is not attached to the movable side case 110, the height H11 from the attaching portion 142a to the top T10 of the curved surface 141 is higher than the height H12 from the fixing portion 112a to the top T10 of the convex surface 111. In other words, the curved surface 141 of the external component 140 curves such that the height H11 of the external component 140 is higher than the height H12 of the convex surface 111. For example, the length from the fixing portion 112a to the fixing portion 112b on the convex surface 111 may be substantially the same as the length from the attaching portion 142a to the attaching portion 142b on the curved surface 141.

When the external component 140 is attached to the movable side case 110 and deformed along the shape of the convex surface 111, the attaching portions 142a and 142b coincide with the fixing portion 112a and 112b of the movable side case 110. That is, because the height H11 of the external component 140 is higher than the height H12 of the convex surface 111, the attaching portion 142a and 142b can be engaged with the fixing portion 112a and 112b when the external component 140 is attached to the movable side case 110.

Figure 5:
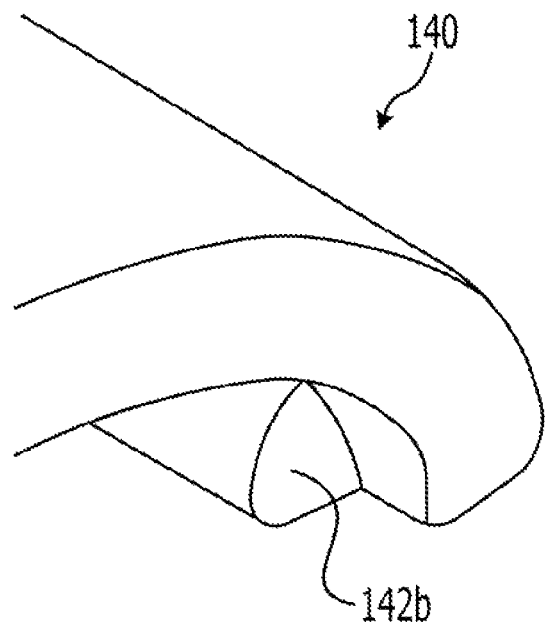
FIG. 5 is an enlarged view of an attaching portion of the external component.

Next, with reference to FIGS. 4 and 5, the fixing portions 112a and 112b of the movable side case 110 and the attaching portions 142a and 142b of the external component 140 will be described. FIG. 5 is an enlarged view of the attaching portion 142b of the external component 140. Because the fixing portions 112a and 112b have the same shape, and the attaching portions 142a and 142b have the same shape, the fixing portion 112b and the attaching portion 142b will be described.

As illustrated in FIG. 4, the fixing portion 112b of the movable side case 110 includes a gentle slope. Specifically, the fixing portion 112b includes a surface sloping in the direction in which the attaching portion 142b is inserted when the external component 140 is attached. As illustrated in FIG. 5, the attaching portion 142b includes a gentle slope. Specifically, the attaching portion 142b is convex in the direction in which the attaching portion 142b is inserted when the external component 140 is attached. That is, when the external component 140 is attached to the movable side case 110, the slope of the attaching portion 142b is engaged with the slope of the fixing portion 112b.

Thus, the external component 140 can be easily attached to the movable side case 110. The external component 140 can be easily removed from the movable side case 110. That is, the user can attach and remove the external component 140 with a low operating force. Because the user can remove the external component 140 from the movable side case 110 with a low operating force, the fixing portions 112a and 112b and the attaching portions 142a and 142b of the external component 140 can be prevented from being damaged.

As described above, the external component 140 in this embodiment has a curved surface 141 attached to the convex surface 111 of the movable side case 110, and attaching portions 142a and 142b fixed to the fixing portions 112a and 112b of the movable side case 110. The curved surface 141 of the external component 140 curves such that the width between the attaching portions 142a and 142b is narrower than the width between the fixing portions 112a and 112b of the movable side case 110. Thus, the external component 140 deforms along the shape of the convex surface 111 when attached to the movable side case 110. That is, the external component 140 can be attached to the movable side case 110 without forming a gap between the external component 140 and the convex surface 111 of the movable side case 110. As a result, even when the shape of the movable side case 110 and the shape of the external component 140 do not coincide with each other, for example, due to the manufacturing error, the external component 140 attached to the movable side case 110 does not rattle. Thus, even when the external component 140 is attached to the portable electronic device 100 according to this embodiment, the portable electronic device 100 can be prevented from looking cheap, and the commercial value thereof can be prevented from decreasing.

The height from the attaching portions 142a and 142b to the top of the curved surface 141 of the external component 140 in this embodiment is higher than the height from the fixing portions 112a and 112b to the top of the convex surface 111. Thus, when the external component 140 is attached to the movable side case 110 and deformed along the shape of the convex surface 111, the attaching portions 142a and 142b coincide with the fixing portions 112a and 112b, and can be engaged with the fixing portions 112a and 112b.

The attaching portions 142a and 142b of the external component 140 in this embodiment each include a gentle slope, and the fixing portions 112a and 112b of the movable side case 110 each include a gentle slope. Thus, the external component 140 can be easily attached to and removed from the movable side case 110. As a result, in the portable electronic device 100 according to this embodiment, the fixing portions 112a and 112b and the attaching portions 142a and 142b of the external component 140 can be prevented from being damaged.

That is, in the portable electronic device 100 according to this embodiment, the width between the attaching portions 142a and 142b is narrower than the width between the fixing portions 112a and 112b, and therefore the external component 140 is not prone to come off of the movable side case 110. In addition, in the portable electronic device 100, the attaching portions 142a and 142b and the fixing portions 112a and 112b each include a gentle slope, and therefore the external component 140 can be easily attached to and removed from the movable side case 110. That is, in the portable electronic device 100 according to this embodiment, when the external component 140 is attached to the movable side case 110, the external component 140 is not prone to come off of the movable side case 110. When the user removes the external component 140 from the movable side case 110 and, for example, when a fingernail, a pin, or the like is inserted between the fixing portion 112a and the attaching portion 142a and a stress acts upward, the external component 140 can be easily removed from the movable side case 110. In other words, when a user uses the portable electronic device 100 according to this embodiment, the user can easily attach the external component 140 to the movable side case 110 and can easily remove the external component 140 when the user performs an operation to remove the external component 140.

In the above embodiment, the external component 140 is attached to and removed from a part of the exterior of the movable side case 110. However, the portable electronic device disclosed by this application can also be applied to a case where an external component is attached to and removed from a location other than a part of the exterior of the movable side case. For example, the portable electronic device disclosed by this application can also be applied to a case where an external component is attached to and removed from the whole of the exterior of the movable side case. For example, the portable electronic device disclosed by this application can also be applied to a case where an external component is attached to and removed from a part or the whole of the exterior of the stationary side case. For example, the portable electronic device disclosed by this application can also be applied to a case where an external component is attached to and removed from a part or the whole of the side of the movable side case and/or the stationary side case.

In the above embodiment, the external component 140 is fixed to the movable side case 110 by engaging the attaching portions 142a and 142b of the external component 140 with the fixing portions 112a and 112b of the movable side case 110. However, the portable electronic device disclosed by this application can also be applied to a case where the external component 140 is screwed to the movable side case 110, and a case where the attaching portions 142a and 142b are fitted in the fixing portions 112a and 112b.

In the above embodiment, the portable electronic device disclosed by this application is applied to a flip-type cellular phone. However, the portable electronic device disclosed by this application can also be applied to cellular phones other than flip-type cellular phones. For example, the portable electronic device disclosed by this application can also be applied to a portable electronic device of straight type in which the case is not divided, or slide type in which one case can be slid relative to the other case.

In the above embodiment, the portable electronic device disclosed by this application is applied to a cellular phone. However, the portable electronic device disclosed by this application is not limited to this. For example, the portable electronic device disclosed by this application can also be applied to other various portable electronic devices such as small information processing terminals, small music reproducers, portable televisions, and portable game machines.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An external component attachable to a portable electronic device, the external component comprising:
   a curved surface attachable to the portable electronic device and that faces a convex surface of the portable electronic device when the external component is attached to the portable electronic device; and
   attaching portions formed at both ends of the curved surface and fixable to the portable electronic device,
   wherein the curved surface curves such that the width between the attaching portions is narrower than the width between fixing portions of the portable electronic device to which the attaching portions are fixable.

2. The external component according to claim 1, wherein the curved surface curves such that the height from the attaching portions to the top of the curved surface is higher than the height from the fixing portions of the portable electronic device to the top of the convex surface.

3. The external component according to claim 1, wherein the attaching portions have protrusions protruding in the directions in which the attaching portions are insertable into the fixing portions.

4. The external component according to claim 1, wherein an external surface of the external component is substantially flush with an external surface of the portable electronic device when the external component is attached to the portable electronic device.

5. A portable electronic device comprising:
   a U-shaped external component that is attached to the portable electronic device and that has attaching portions at both ends thereof;

a convex surface that has a width wider than the width between the attaching portions, and that expands the width between the attaching portions and faces a curved surface of the external component when the external component is attached to the portable electronic device; and fixing portions that are formed at both ends of the convex surface and to which the attaching portions of the external component are fixed.

6. The portable electronic device according to claim 5, wherein the fixing portions are concave in the directions in which the external component is inserted, and the attaching portions have protrusions protruding in the directions in which the attaching portions are inserted into the fixing portions.

7. The portable electronic device according to claim 5, wherein an external surface of the external component is substantially flush with an external surface of the portable electronic device.

* * * * *